United States Patent [19]

Compton et al.

[11] Patent Number: 4,924,491
[45] Date of Patent: May 8, 1990

[54] ARRANGEMENT FOR OBTAINING INFORMATION ABOUT ABANDONED CALLS

[75] Inventors: Merle F. Compton, Thornton; Vincent D. Vanacore, Boulder; Brian W. Walsh, Westminster, all of Colo.

[73] Assignee: American Telephone and Telegraph Company, New York, N.Y.

[21] Appl. No.: 273,285

[22] Filed: Nov. 18, 1988

[51] Int. Cl.⁵ .................... H04M 11/04; H04M 3/50; G08B 25/00

[52] U.S. Cl. ........................ 379/37; 379/45; 379/49; 379/127; 379/201

[58] Field of Search ............... 379/33, 37, 38, 45, 379/49, 249, 134, 127, 46, 50, 201

[56] References Cited

U.S. PATENT DOCUMENTS

| | | | |
|---|---|---|---|
| 3,881,060 | 4/1975 | Connell et al. | 379/50 |
| 4,052,569 | 10/1977 | Pirnie, III | 379/45 |
| 4,591,665 | 5/1986 | Foster et al. | 379/249 |

FOREIGN PATENT DOCUMENTS

| | | | |
|---|---|---|---|
| 0154865 | 9/1984 | Japan | 379/201 |
| 0169060 | 7/1986 | Japan | 379/247 |
| 0006567 | 1/1987 | Japan | 379/201 |

OTHER PUBLICATIONS

E. G. DeNigris et al, "Enhanced 911: Emergency Calling with a Plus", Mar. 1980, *Bell Laboratories Record*, pp. 74–79.

P. Ruggieri, "Dial 911 for Profits", *Sound & Communications*, May 1984, pp. 9, 10, 13.

AT&T System 85 Release 2, Versions 1–4 Features Reference Manual, Issue 1 (Jul. 1987), pp. 109-1 to 109-13.

Bell Communications Research, E911 *Public Safety Answering Point: Interface Between a 1/1AESS TM Switch and Customer Premises Equipment*, Technical Reference TR-TSY-000350, Issue 1 (11-87).

*Primary Examiner*—Jin F. Ng
*Assistant Examiner*—Wing F. Chan
*Attorney, Agent, or Firm*—David Volejnicek

[57] ABSTRACT

An emergency call service system, such as an E911 system, provides service system personnel with the addresses of abandoned calls to facilitate abandoned call follow-up. When a call comes in to a "911" ANI controller (21), the calling number is recorded. If the call is abandoned prior to being assigned by ACD 23 to an agent position (27–28) for being answered, an abandoned call ALI function (25) is invoked to obtain information pertaining to the calling number from a database (20), similarly to a non-abandoned call. When obtained, the information is displayed on equipment (29) such as a printer, terminal, or PC, to make it available to system personnel for use in following up on the call. The ANI controller serves both "911" emergency calls and emergency call-handling agents as well as other calls and other users, by switching the emergency calls to the agents and switching the other calls to the other users.

15 Claims, 2 Drawing Sheets

– 1 –

ARRANGEMENT FOR OBTAINING INFORMATION ABOUT ABANDONED CALLS

TECHNICAL FIELD

The invention relates generally to telephony, and relates specifically to the obtaining of information about individual calls.

BACKGROUND OF THE INVENTION

Service providers, and particularly providers of emergency services such as fire, police, and rescue departments, often have a desire and a need to follow up on calls which are placed to them but then are abandoned. For example, a call to a fire department may be abandoned as a result of fire damage to the calling equipment or line, so the fire department needs to follow up on the call to determine whether a fire exists. Or a call to a police department by a crime victim may be abandoned by action of the criminal, so the police department needs to follow up on the call to determine if a crime has been committed and to rescue the victim.

For many non-emergency services, knowing the originating telephone number of the abandoned call is sufficient for follow-up: knowing the number enables the service provider to call the caller back. However, for most emergency services, knowing the originating telephone number of the abandoned call is not enough, as the above examples amply illustrate. More information about the abandoned call is needed, particularly the address from which the call originated.

Emergency service equipment, such as enhanced 911 (E911) emergency call service equipment, often automatically provides information about a call, including the address from which the call originated, once the call has been answered by an emergency service agent. When a call is received by the emergency service equipment, the ANI (Automatic Number Identification) telephony service feature provides the equipment with the originating, i.e., the calling, number for the call. The number is stored and the call is placed in a queue to await assignment to an available agent. Once the call has been assigned to an agent, the equipment makes a request to a remote database of information about telephone numbers, including their addresses, to provide information about the calling number. The calling number, and the identity of the agent to whom the call is assigned, are provided as part of the request. The requested information is provided by the database to the requesting emergency service equipment, which then directs it to the appropriate agent. When the agent answers the call, the information is displayed on the agent's terminal.

Unfortunately, the information about the calling number is not provided by the emergency service equipment for calls that have been abandoned prior to being delivered to an agent. At best, the equipment provides a printed record of abandoned calls that includes the calling numbers. But it specifically does not obtain from the database and display the address of the calling number and—for various reasons such as security of the database against unauthorized access—emergency service personnel do not have ready access—and often have no access at all—to the information in the database once the call has been abandoned. Consequently, their efforts at follow-up of abandoned calls are seriously hampered.

A further disadvantage of the emergency service equipment such as the conventional E911 equipment characterized above, is that it is dedicated to serving emergency calls and emergency service agents only. Hence, separate equipment must be provided to serve other calls and other communities of users, even when the emergency service equipment has call-handling capacity in excess of that required to handle emergency calls. This is clearly inefficient.

SUMMARY OF THE INVENTION

This invention is directed to solving these and other disadvantages of the prior art. According to a first aspect of the invention, the origin of an existing call is determined (for example via ANI), and when the call is detected to be abandoned, information about the location of the determined call origin is automatically obtained, illustratively from the above-mentioned conventional database. The obtained information is then provided to a user, illustratively by being displayed on a terminal or printed on a printer. Advantageously, the information is thereby made available to the user, such as emergency service personnel, so that he or she may follow-up on the abandoned call.

According to a second aspect of the invention, an emergency call-handling system is founded on a call controller that jointly serves two communities of users, one of which is charged with handling emergency calls. The controller receives both emergency and other calls, and then switches—connects—the received emergency calls to users in the first community and switches the other received calls to users in the second community. The system obtains the calling numbers of the received emergency calls and initiates retrieval of information about those calling numbers from a source of such information. For received emergency calls that become abandoned, the system makes a record of them. This record may advantageously be used in following up on abandoned emergency calls. The system is not restricted to serving emergency calls and the community of users that handles those calls, but serves other calls and other users as well, thereby avoiding the need to have a separate system for serving the other calls and users.

These and other advantages and features of the invention will become more apparent from the following description of an illustrative embodiment of the invention considered together with the drawing.

DETAILED DESCRIPTION

Figure 1:
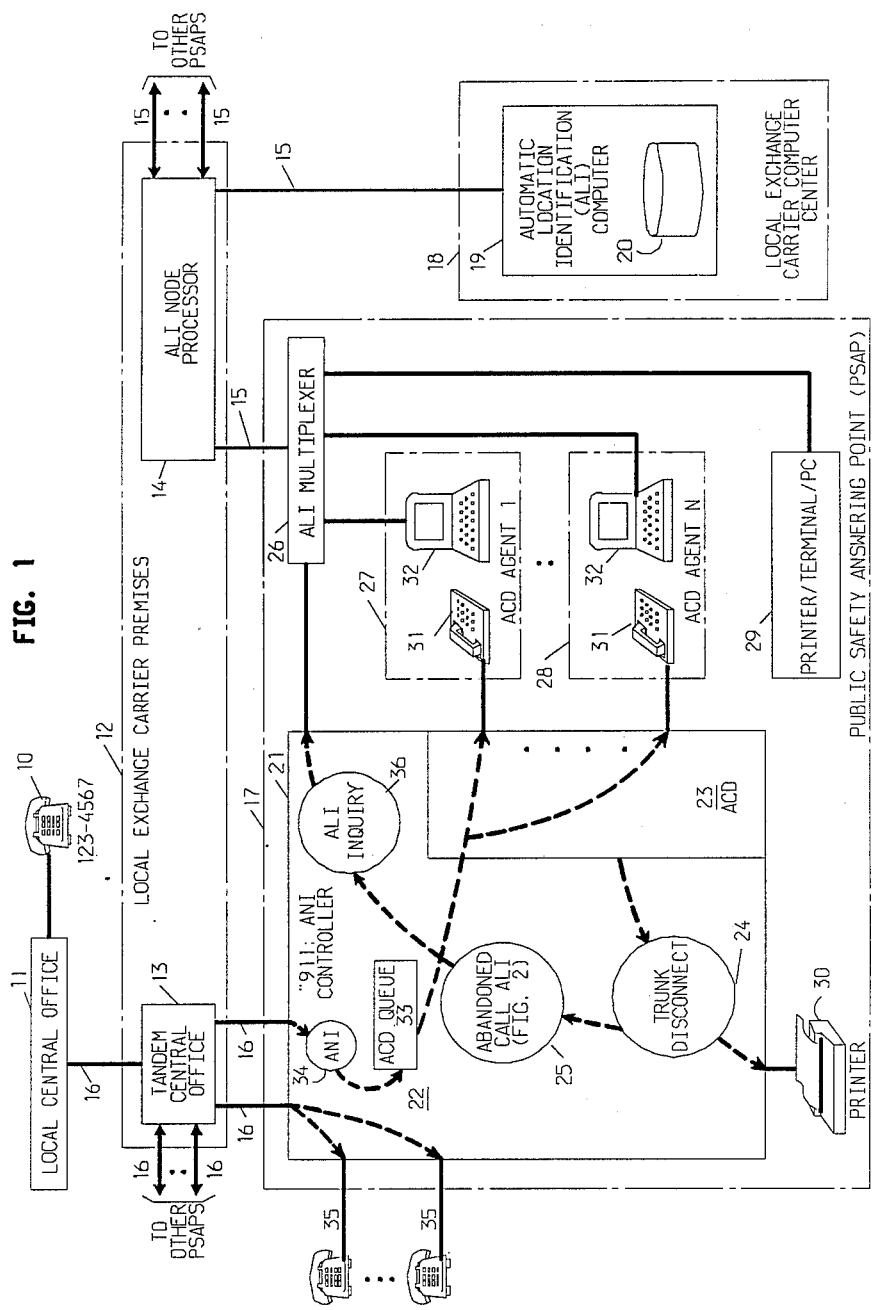
FIG. 1 is a block diagram of an emergency service system including an illustrative embodiment of the invention.

FIG. 1 shows an emergency service system. At the heart of the system is a public safety answering point (PSAP) 17. PSAP 17 is the facility at which emergency telephone calls are answered and the provisioning of emergency services is initiated. The illustrative PSAP 17 shown is an E911 emergency system. Systems of this kind are well known. (See, for example, "E911 Public Safety Answering Point: Interface Between a 1/1A-ESS ™ Switch and Customer Premises Equipment", Technical Reference TR-TSY-000350, Issue 1, November 1987, by Bell Communications Research). PSAP 17 includes a "911" ANI controller 21. Controller 21 is illustratively conventional equipment such as the AT&T ANI controller and display system 22 plus an ACD (Automatic Call Distribution) adjunct 23, such as the one made by Digital Transmission Incorporated. Alternatively, controller 21 is the AT&T System 85/E911 ANI controller 22 running the AT&T ACD software 23. Controller 21 provides private branch exchange (PBX)-type functions for the incoming emergency calls, including call-switching functions provided by element 22 and call-distribution functions to emergency service agents' positions 27-28 provided by element 23. In the latter-mentioned embodiment, wherein controller 21 is based on a PBX such as the AT&T System 85, controller 21 may also be functioning as a conventional PBX and serving non-emergency calls, and a community of users 35 other than agents responsible for handling emergency calls, along with the emergency calls and the emergency call-handling agents. In that case, controller 21 switches received emergency calls (identified as such by the trunks over which they are received at controller 21) to the emergency call-handling agents, and switches other calls to the other users in a conventional PBX-like manner.

PSAP 17 includes a plurality of agent positions 27-28 for answering the emergency calls. Each position 27-28 includes a voice terminal 31, such as a multi-function telephone set, for answering the emergency voice calls, and a display monitoring unit (DMU) 32, such as a data terminal, for displaying data information associated with the call. Each agent position 27-28 is illustratively the AT&T display management system (DMS).

PSAP 17 also includes an automatic location identification (ALI) multiplexer 26 which distributes data information to the proper agent position 27-28. Multiplexer 26 is illustratively the AT&T ALI multiplexer. Additionally, PSAP 17 includes a printer 30 which is used to print a log of abandoned calls, and a device 29 for providing data information associated with abandoned calls to emergency service personnel. Device 29 is illustratively a printer or a terminal for displaying the data information, or a personal computer equipped with a disk for storing the data information and displaying it on command.

PSAP 17 receives emergency calls through a tandem central office 13 located on the premises 12 of a local exchange carrier. Tandem central office 13 is connected by central office and E911 trunks 16 to PSAP 17 as well as to other PSAPs, and by interoffice trunks 16 to telephony local central offices 11, of which one is shown. The local central offices are in turn connected to terminal equipment 10 of telephony service subscribers. The telephone system made up of tandem central office 13 and local central offices 11 provide automatic number identification (ANI): they provide a called party with the telephone number of the calling party.

A local central office 11 which receives a "911" call from subscriber terminal equipment 10 automatically connects the call over a trunk 16 to tandem central office 13 and forwards to office 13 the calling telephone number. Based on the received telephone number, office 13 connects the call over a trunk 16 to one of the PSAPs and forwards to that PSAP the calling telephone number.

Office 13 also connects non-911 calls destined for PSAPs to the appropriate PSAPs over trunks 16. For any PSAP, however, the non-911 calls are connected over trunks 16 which are different from trunks 16 over which the 911 calls are connected.

Assuming that the call comes to PSAP 17, it is received by controller 21. If it is a non-911 call, it is connected by controller 21 to call-destination one of the community of users 35, in a conventional manner. If it is a 911 call, it is stored in a first-in, first-out ACD queue 33 to await the freeing of an agent at one of the positions 27-28 to receive the call. The calling telephone number of the call is captured by an ANI function 34 and is stored in memory along with other information about the call. Calls are retrieved from queue 33 and distributed to positions 27-28 by ACD 23. When ACD 23 assigns a call to a position 27-28, it causes an ALI inquiry function 36 of controller 21 to formulate and send a message to ALI multiplexer 26 requesting information on the calling number. The calling number of the call, and the identification of the position 27-28 to which the call has been assigned are provided by ACD 23 to ALI inquiry function 36 and are included in the message.

ALI multiplexer 26 is connected by one or more links 15 to an ALI node processor 14. ALI multiplexer 26 forwards the message to ALI node processor 14. ALI node processor 14 is located on premises 12 of the local exchange carrier and is connected by links 15 to PSAP 17 and to other PSAPs 17, and also to an ALI computer 19. ALI node processor 14 acts as a concentrator and deconcentrator, forwarding messages received from the PSAPs to ALI computer 19 and forwarding message responses received from ALI computer 19 to the appropriate PSAPs.

ALI computer 19 is located at a computer center 18 of the local exchange carrier. Center 18 is typically remote from premises 12 and from PSAPs. ALI computer 19 manages a database 20 of information associated with telephone numbers. The associated information includes items of information such as the name and the address of the subscriber to whom the number is assigned, personal data concerning the subscriber that may be of help to emergency service personnel, and the phone numbers of the subscriber's local police, fire, and rescue departments.

In response to receipt of a message requesting the information associated with a telephone number, ALI computer 19 retrieves the information from database 20, formats it into a response message, and sends the response message to ALI node processor 14. Processor 14 in turn sends the response to the appropriate PSAP—the PSAP 17 in this example—where it is received by ALI multiplexer 26 and forwarded to the agent position 27-28 that has been assigned to handle the call. When the agent at the position 27-28 answers the call, the data associated with the call's originating number are displayed on the position's DMU 32.

Any time during the progress of the call from terminal 10, the call may be abandoned, i.e., terminated before being answered and handled by an agent. Once the call has progressed as far as being connected to controller 21 of PSAP 17, a record thereof is made on printer 30 even if the call is abandoned. A trunk disconnect function 24 of controller 21 is invoked whenever controller 21 detects call termination. Function 24 retrieves and prints out on printer 30 a record of the call which illustratively includes the calling telephone number, the time of receipt of the call by controller 21, the time of call termination, whether the call was terminated prior to being answered by an agent (i.e., abandoned), and which agent handled the call (if the call was not abandoned). Function 24 is well-known in the art. No other information associated with the calling number is typically available to function 24 at this time—particularly not the address of the calling number.

Once a call has been answered by an agent at a position 27-28, information associated with the calling number—including the address—becomes available to PSAP 17 personnel on DMU 32. Hence, the information is available for call follow-up purposes even if the call is abandoned. However, if the call is abandoned between the time that is received by controller 21 and the time it is answered by an agent at position 27-28, no information suited for follow-up purposes, other than the calling number, conventionally becomes available to PSAP 17 personnel.

Therefore, in accordance with the invention, there is included in controller 21 an abandoned call ALI function 25. The purpose of function 25 is to obtain from ALI computer 19 and to make available to PSAP 17 personnel the information stored in database 20 which is associated with the calling numbers of calls received by controller 21 but abandoned prior to being either assigned to or answered by an agent at a position 27-28. When a call is terminated, trunk disconnect function 24 is invoked, as was mentioned above. Function 24 in turn invokes abandoned ALI function 25 as part of its operation. If the call was abandoned, function 24 marks the call as being abandoned prior to invoking abandoned call ALI function 25.

Figure 2:
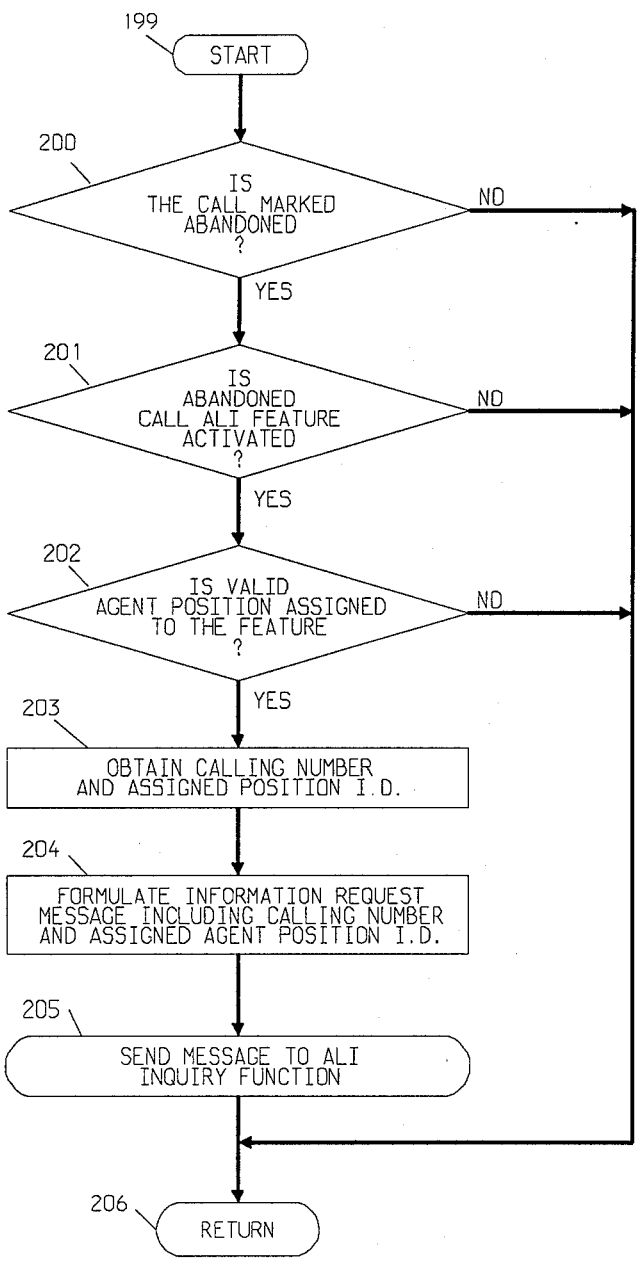
FIG. 2 is a flow diagram of the abandon call ALI element of the system of FIG. 1.

Function 25 is diagrammed in FIG. 2. Upon being invoked (i.e., started) at step 199, function 25 checks if the call has been marked as abandoned, at step 200. If not, function 25 merely returns to function 24, at step 206; if so, function 25 checks if the abandoned call ALI feature is activated, at step 201. Illustratively, function 25 makes the determination by checking a feature-selection memory table of controller 21. A PSAP 17 may not want to have the feature activated because it places an additional load on the ALI network: multiplexer 26, processors 14 and 19, and trunks 15. If the feature is not activated, function 25 merely returns to function 24, at step 206.

If the abandoned ALI feature is found to be activated at step 201, function 25 checks whether a valid agent position is assigned to the feature, at step 202. By this step, function 25 is determining whether equipment 29 is connected to a port of ALI multiplexer 26. Function 25 performs the check illustratively by examining controller 21 memory for designation of an ALI multiplexer 26 port as an abandoned call-handling port. If no valid agent position (port) has been assigned to the feature, function 25 merely returns to function 24, at step 206.

If it is determined at step 202 that an agent position has been assigned to the feature, function 25 obtains the I.D. of the assigned position (illustratively in the same manner as it performed the check at step 202) and the calling number of the abandoned call (as mentioned above, this number was obtained by ANI function 34 when the call was received by controller 21 and was stored in memory of controller 21), at step 203. Function 25 then formulates a message to ALI inquiry function 36 requesting information associated with the calling number from database 20, at step 204. The message includes the calling number and the I.D. of the agent position (port) assigned to handle abandoned calls. The message duplicates the message formulated by ACD 23 for a call which was assigned to an agent position 27-28, described above.

Once the message is formulated, at step 204, function 25 sends the message to ALI inquiry function 36, at step 205. Function 25 then returns to function 24, at step 206.

The message is handled by the ALI network—function 36, multiplexer 26, and processors 14 and 19—just like a message from ACD 23 as described above. When the response from processor 19 conveying the requested information is received by ALI multiplexer 26, it channels it to equipment 29 which is connected to the agent position (port) assigned to handle abandoned calls. At equipment 29, the requested information is made available to PSAP 17 personnel, in the manner discussed previously.

Of course, it should be understood that various changes and modifications to the illustrative embodiment described above will be apparent to those skilled in the art. For example the determination of whether a call is considered to have been abandoned may be based either on whether the call was assigned to an agent position or on whether it was answered at an agent position, at the time of its termination. In the former case, if there exists a possibility that a call could be assigned to an agent position but be abandoned before being answered, information associated with such a call's originating number may be redirected by the receiving agent position to a printer or a display or some such other equipment, to make it available to PSAP personnel. Or, the printer 30 and equipment 29 may be a single piece of equipment shared in use by the trunk disconnect function and the abandoned call ALI function. Such changes and modifications can be made without departing from the spirit and the scope of the invention and without diminishing its attendant advantages. It is therefore intended that all such changes and modifications be covered by the following claims.

We claim:

1. Apparatus for providing information about an abandoned call, comprising
    means responsive to a call for determining an origin of the call;
    means for detecting that the call has been abandoned prior to being one of (a) assigned or (b) answered; and
    means connected to the determining means and to the detecting means, for obtaining geographical location address of the determined call origin, in response to the detection of abandonment of the call, to make the information available to a user.

2. The apparatus of claim 1 including
    means connected to the obtaining means for providing the obtained information to a user.

3. The apparatus of claim 1 wherein the call is an emergency call, and the determining, detecting, and obtaining means are included in an emergency call controller.

4. Apparatus for providing information about an abandoned call, comprising:
    means responsive to an incoming call for obtaining a calling number of the call;
    means for monitoring the call to detect if the call has been abandoned prior to being answered;
    means connected to the obtaining means and the monitoring means for initiating a request to a source of information about call numbers for a geographical location address of the calling number, in response to detection that the call has been abandoned prior to being answered; and means responsive to receipt of the requested address from the source of information for displaying the requested address.

5. Apparatus for providing information about an abandoned call, comprising:

means responsive to an incoming call for obtaining a calling number of the call;

means for assigning the call to be answered by one of a plurality of stations for serving the call;

means for monitoring the call to detect if the call has been abandoned prior to being assigned;

means connected to the obtaining means and the monitoring means for initiating a request to a source of information about call numbers for an address of the calling number, in response to detection that the call has been abandoned prior to being assigned; and means responsive to receipt of the requested address from the source of information for displaying the requested address.

6. The apparatus of claim 4 wherein the call is an emergency call, and the obtaining, monitoring, and initiating means are included in an emergency call controller.

7. An emergency-call service system comprising:

means responsive to an incoming call identified as an emergency call for obtaining a calling number of the call;

means for assigning the call to be answered by one of a plurality of stations for serving the call;

means for monitoring the call to detect if the call has been abandoned prior to being one of (a) assigned and (b) answered;

means for initiating a request to a source of information about call numbers for information about the calling number including a street address of the calling number, in response to the call being abandoned prior to being one of (a) assigned and (b) answered;

means for initiating a request to the source of information about call numbers for the information about the calling number in response to the call being assigned;

means responsive to receipt of information for displaying the received information;

means responsive to receipt of requested information from the source of information for sending received requested information about the calling number of an assigned call to the assigned station for use in serving the call, and for sending received requested information about the calling number of a call abandoned prior to being one of (a) assigned and (b) answered to the displaying means for use in following up on the call.

8. An emergency-call service system comprising:

a call controller for serving a first community of users charged with handling emergency calls and a second community of users, the controller being responsive to receipt of emergency and other calls for switching the received emergency calls to the first plurality of users and switching the other received calls to the second plurality of users;

means cooperating with the controller for obtaining calling numbers of the emergency calls received by the controller;

means cooperating with the obtaining means for initiating retrieval of information about, including the street address of, the calling numbers of the emergency calls and not of the other calls from a source of the information; and means cooperating with the controller for making a record of the emergency calls, including the calls' street addresses, received by the controller and abandoned.

9. Method of providing information about an abandoned call, comprising the steps of:

detecting existence of a call;

determining an origin of the call;

detecting that the call has been abandoned prior to being one of (a) assigned or (b) answered;

obtaining a geographical location address of the determined call origin, in response to the detection of abandonment of the call; and providing the obtained information to a user.

10. Method of providing information about an abandoned call, comprising the steps of:

detecting an incoming call;

obtaining a calling number of the call;

monitoring the call to detect if the call has been abandoned prior to being answered;

initiating a request to a source of information about call numbers for a geographical location address of the calling number, in response to detecting that the call has been abandoned prior to being answered;

receiving the requested address; and displaying the received address.

11. Method of providing information about an abandoned call, comprising the steps of:

detecting an incoming call;

obtaining a calling number of the call;

assigning the call to be answered by one of a plurality of stations for serving the call;

monitoring the call to detect if the call has been abandoned prior to being assigned;

initiating a request to a source of information about call numbers for an address of the calling number, in response to detecting that the call has been abandoned prior to being assigned;

receiving the request address; and displaying the received address.

12. A method of serving emergency calls comprising the steps of:

detecting an incoming call identified as an emergency call;

obtaining a calling number of the call;

assigning the call to be answered by one of a plurality of stations for serving the call;

monitoring the call to detect if the call has been abandoned prior to being one of (a) assigned and (b) answered;

initiating a request to a source of information about call numbers for information about the calling number including a street address of the calling number, in response to the call being abandoned prior to being one of (a) assigned and (b) answered;

initiating a request to the source for the information about the calling number in response to the call being assigned;

receiving requested information from the source of information;

sending received requested information about the calling number of an assigned call to the assigned station for use in serving the call; and sending received requested information about the calling number of a call abandoned prior to being one of (a) assigned and (b) answered to a display apparatus for use in following up on the call.

13. A method of serving calls including emergency calls, comprising the steps of:

receiving both emergency and other calls at a call controller;

switching the received emergency calls by operation of the call controller, to a first community of users charged with handling emergency calls;

switching the received other calls, by operation of the call controller, to a second community of users;

obtaining calling numbers of the received emergency calls;

initiating retrieval of information about, including the street address of, the calling numbers of the emergency calls and not of the other calls from a source of the information; and making a record of the emergency calls, including the calls' street address, received by the controller and abandoned.

14. Apparatus for providing information about an abandoned call, for use with an arrangement responsive to a call for identifying the call and for detecting that the call has been abandoned, comprising:

means connected to the arrangement, for obtaining information identifying the physical location of an origin of the identified abandoned call, in response to detection of abandonment of the call, to make the information available to a user.

15. Apparatus for providing information about an abandoned call, comprising:

means responsive to information identifying a call and to a determination that the call has been abandoned, for obtaining information identifying the physical location of the identified abandoned call's origin to make the information available to a user.

* * * * *